Sept. 14, 1948.    A. D. ZAPPACOSTA    2,449,358
ECHO SOUNDING SYSTEM WITH SENSITIVITY CONTROL
Filed Feb. 23, 1946
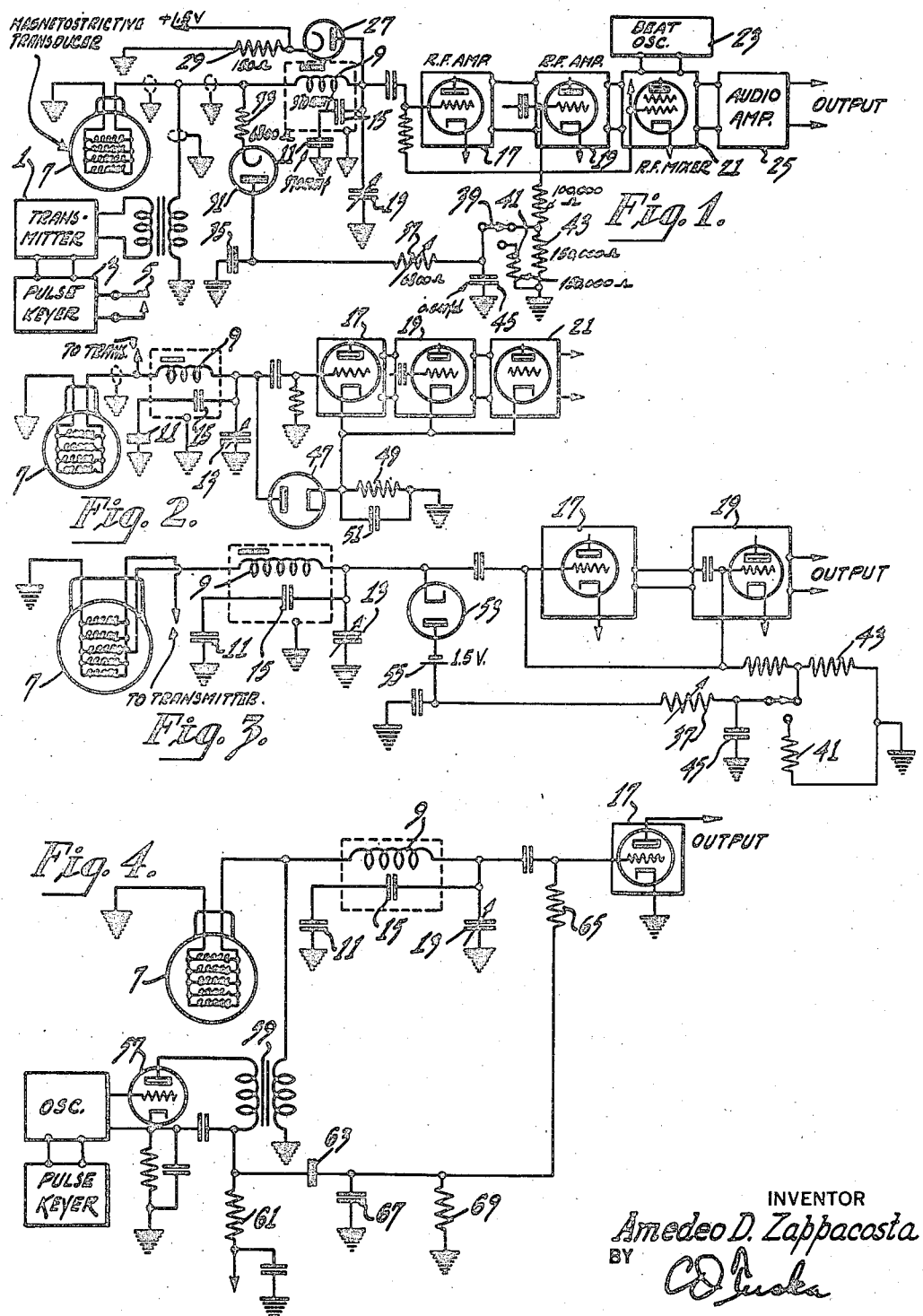
INVENTOR
Amedeo D. Zappacosta
BY
ATTORNEY Patented Sept. 14, 1948

2,449,358

UNITED STATES PATENT OFFICE 2,449,358

ECHO SOUNDING SYSTEM WITH
SENSITIVITY CONTROL

Amedeo D. Zappacosta, Havertown, Pa., assignor
to Radio Corporation of America, a corporation
of Delaware Application February 23, 1946, Serial No. 649,604

6 Claims. (Cl. 177—386)

1

This invention relates to underwater signalling systems of the type employing an electromechanical transducer to radiate a high frequency sound wave through water to determine the position and distance of an object by measuring the angle of arrival and transit time of a received echo reflected from the object; and particularly to such a device wherein the receiver is protected against the relatively strong transmitted pulses which would otherwise be applied to the receiver, particularly where the transducer is used both for transmitting and receiving.

Equipment of this type is conventionally employed by ships at sea for the location of enemy submarines or other underwater obstacles. Short pulses of electrical energy of the highest possible intensity are applied to a magnetostrictive transducer, for example, which converts the electrical energy into corresponding sound waves which are radiated from the ship to produce an echo signal. In order to conserve equipment, it is desirable to employ a single magnetostrictive transducer both for transmission and reception, and it is well known that devices of this type are readily adaptable for this purpose, since they convert electrical energy to sound energy or sound energy to electrical energy equally well. The common use of the transducer makes it essential to provide means for preventing intense signalling pulses from damaging the receiver or otherwise having a deleterious effect on its operation. If not suitably protected the transmitted pulses may block or paralyze the receiver and render it relatively useless for measuring echoes reflected from objects relatively close to the transmitter. It has also been observed that pulses are reflected from the adjacent surface of the vessel, causing an echo to be received which may give an erroneous indication if not properly suppressed. However, the receiver must be able to respond to echo pulses arriving in an extremely short interval of time after the initial pulse has been transmitted in order to maintain operability for the indication of nearby objects. Full receiver sensitivity, however, is not required in such case, since the intensity of the reflected echo is inversely proportional to the distance. Thus, if the receiver is desensitized to protect it from the transmitted pulse, it may be restored to full sensitivity gradually without interfering with its proper operation.

One of the objects of this invention is to protect a receiver against the deleterious effect of a strong transmitted pulse. A further object of this invention is to provide means for reducing the sensitivity of a receiver to all signals except the desired echo signal. A still further object of this invention is to prevent the establishment of high potentials in the input circuit of a receiver which is utilized with a pulse transmtter for the measurement of the distance to an object producing a reflected echo.

In brief, the above objects are accomplished by connecting a biased diode rectifier across the resonant input circuit of the receiver. The rectifier remains non-conductive, and thus has an extremely high impedance, until a signal voltage exceeding the bias voltage is received.

In such case the rectifier impedance becomes extremely low and effectively short-circuits the resonant input circuit, thus preventing the establishment of dangerously high potentials. In addition, the same, or a different rectifier is utilized to produce a direct current potential of such polarity and value that it may be used to bias to cut off one or more of the receiver tubes. Suitable time delay circuits are included to make certain that the receiver remains insensitive the desired length of time.

The novel features that I consider characteristic of my invention are set forth with particularity in the appended claims. The invention itself, however, both as to its organization and method of operation, as well as additional objects and advantages thereof, will best be understood from the following description of several embodiments thereof when read in connection with the accompanying drawings, in which Figure 1 is a schematic drawing of an embodiment employing separate rectifiers;

Figure 2 is a schematic drawing of an embodiment employing a single rectifier for shunting the input circuit and developing a positive bias voltage;

Figure 3 is a schematic diagram of an embodiment employing negative grid bias control, and Figure 4 is a schematic drawing of a portion of a receiver circuit in which the biasing voltage is derived from the transmitter circuit.

Referring to Fig. 1, a transmitter 1 is keyed automatically by a pulse keyer 3 to produce a succession of pulses of high frequency electrical energy in which the pulse duration is small with respect to the interval between successive pulses, but relatively large with respect to the pulse frequency. Hand operated key 5 may be used alternatively if code communication is desired between two ships equipped with apparatus of this type. The output of the transmitter is connected to a magnetostrictive transducer 7 which comprises a plurality of series-parallel connected magnetostrictive elements. The receiver input is also connected to the same elements of the transducer 7. The receiver input may include a resonant circuit comprising variable inductor 9 and capacitors 11, 13 and 15, which are connected between the high potential terminal of inductor 9 and ground. The low potential terminal of inductor 9 is returned to ground through the coils of transducer 7. The resonant circuit is, of course, tuned to the carrier frequency of the transmitted pulses and is coupled to the input of the first radio frequency amplifier 17, which in turn applies the amplified energy to successive stages of radio frequency amplification 19, and thence to a radio frequency mixer tube 21 which combines the received signal with the output of a beat frequency oscillator 23. An audio amplifier 25 provides the output signal which may be applied to any conventional indicator system which may be desired, and which has not been illustrated, since it does not constitute a part of this invention.

Connected in parallel with the resonant input circuit is a diode rectifier 27 having its cathode connected to ground through a series resistor 29 which has a low value; for example, 150 ohms. The cathode is also connected to any conventional source of positive biasing voltage of approximately 1½ volts D. C. The low potential end of inductor 9 is connected to the cathode of a second diode rectifier 31 through a limiting resistor 33. The anode is bypassed to ground through a capacitor 35 and connected through variable resistor 37 to selector switch 39, and then to ground through either resistor 41 or a resistor 43, depending on the position of the switch. The latter resistor is included in the grid return circuit of one or more of the amplifier tubes utilized in radio frequency amplifiers 17 or 19, or the tube used in the mixer 21.

Rectifier 27 protects the receiver against excessive voltages from the transmitter by essentially short-circuiting the resonant input circuit of the receiver when the transmitter voltage exceeds a predetermined value. The low impedance presented across the resonant input circuit destroys the "Q" of the circuit and prevents the establishment of a high voltage in the input circuit. This does not affect the normal operation of the receiver, however, since echo pulses seldom exceed a value which would produce more than one and one-half volts across the resonant input circuit and the receiver sensitivity is sufficient to provide full output for echo signals of less than this amplitude. As an additional protection, rectifier 31 develops a negative biasing potential which is applied through the delay circuit consisting of resistor 37 and capacitor 45 to the grid of one or more of the receiver tubes. It it is desired to employ the manual key 5 for code communication, it may be desirable to permit the operator to hear his own transmitted signals, since this greatly facilitates the proper keying. To accomplish this, switch 39 is placed in its clockwise position, thus removing the rectified bias from the amplifier tubes. In the counterclockwise position illustrated, however, the negative bias is applied to the grids of one or more amplifier tubes in the manner illustrated.

An alternative embodiment is shown in Fig. 2, which illustrates a portion of the system sufficient to describe the nature of this embodiment. The high potential end of resonant inductor 9 is connected to the anode of a diode rectifier 47, the cathode of which is grounded through a resistor 49, which may be bypassed with a capacitor 51. The cathode is also connected to the cathode electrodes of one or more of the tubes contained in amplifiers 17 or 19 or the mixer 21. During positive peaks of the applied carrier frequency, current will flow through resistor 49 and cause the potential of the cathode to become positive. This positive potential is applied directly to the cathodes of the amplifier tubes, which causes them to be biased off, since their grid electrodes are returned to ground. It should also be noted that when rectification occurs to produce the limiting bias voltage, the tube impedance becomes extremely low and is effectively in parallel with the resonant input circuit. It thus has the double purpose of short-circuiting the resonant input to the receiver and developing a positive control bias.

A similar embodiment is illustrated in Fig. 3, in which a negative biasing potential is developed. The high potential terminal of resonant inductor 9 is connected, in this case, to the cathode of a diode rectifier 53, the plate electrode being grounded through resistor 37 and one or the other at resistors 41 or 43 in the manner illustrated in Fig. 1. The time delay network includes capacitor 45, and a delay voltage is applied to the rectifier by means of a battery 55. When the applied radio frequency potential exceeds one and one-half volts, rectified current will flow through the rectifier in such direction as to develop a negative bias at the grid end of resistor 43. This point is connected to the grid electrodes of one or more of the amplifiers, or the mixer of the receiver, as in the previous cases illustrated. It should be noted that when rectification occurs to produce the limiting bias voltage, the tube impedance becomes extremely low and is effectively in parallel with the resonant input circuit and it thus has the double purpose of short circuiting the input to the receiver and developing a negative control bias.

Referring now to Fig. 4, I have shown an embodiment in which the control bias for desensitizing the receiver is obtained directly from the circuit of the transmitter. This circuit may be used in conjunction with the shunt diode shown in Fig. 1, to protect the input coil 9 from excessive voltages, if desired. Thus transmitter 1 may include an amplifier tube 57, the anode of which is coupled to the output through a transformer 59. Positive potential for the anode is supplied from any convenient positive direct current source through a series resistor 61 which is bypassed to ground to provide a properly filtered voltage. The transmitter end of a resistor 61 is coupled by a capacitor 63 and a series connected resistor 65 to the grid electrode of one or more of the receiver tubes, amplifier 17, for example. It will be appreciated that when the transmitter is cut off a constant positive potential will be applied to the left hand plate of capacitor 63. When keyed, the transmitter pulse causes a momentary surge of plate current to flow through resistor 61, as a result of which the potential at the same point suddenly becomes more negative. This negative pulse is applied to the grid of one or more of the receiver tubes by capacitors 63. At the same time, the negative pulse charges a shunt connected capacitor 67. The voltage across capacitor 67 will then leak off at a predeterminable rate through shunt-connected resistor 69. At the end of the keying pulse, a positive impulse will be applied by capacitor 63 to reverse the charge of capacitor 67 and quickly remove the negative biasing voltage previously established. This quickly returns the receiver to normal sensitivity for the reception of the echo pulse.

What I claim is:

1. In an underwater signalling system having a common electromechanical transducer for transmission and reception, a receiver having an input circuit coupled to said transducer, a pulse transmitter coupled to said transducer, rectifier means coupled to said transmitter and in circuit with said receiver for reducing the sensitivity thereof during periods of transmission, said means also effectively short-circuiting said receiver input circuit in response to applied signalling voltages exceeding a predetermined minimum.

2. In an underwater signalling system having a common electromechanical transducer for transmission and reception, a receiver having a resonant input circuit coupled to said transducer, a pulse transmitter coupled to said transducer, a biased diode connected in parallel with said input circuit for effectively short-circuiting said input circuit when the voltage therein exceeds the value of said bias, whereby said receiver is protected against excessive currents from said transmitter, means including said biased diode for developing a bias voltage corresponding to the duration of transmitted pulses from said transmitter, and means for utilizing said bias voltage to reduce the sensitivity of said receiver.

3. A device of the character described in claim 2 including means for storing said bias voltage for a determinable period after the termination of each pulse.

4. In an underwater signalling system having an electromechanical transducer, a pulse transmitter for applying spaced pulses of electrical energy to said transducer whereby an energy wave is radiated toward an object to be detected, and a receiver having a tuned input circuit and a variable gain amplifier tube effectively connected to said transducer for receiving echo pulses reflected from said object, the combination of rectifier means connected in parallel with said tuned circuit for effectively short-circuiting said input circuit when the voltage therein exceeds a predetermined amplitude, means including said rectifier means for developing bias voltage pulses concurrently with the application of said pulses to said transducer, and means for applying said bias voltage pulses to said amplifier tube to reduce the gain thereof.

5. The combination set forth in claim 4 including, in addition, means for gradually reducing the amplitude of each bias voltage pulse so as to restore said receiver to full sensitivity substantially only when said echo pulses are received.

6. In an underwater signalling system having an electromechanical transducer, a pulse transmitter for applying spaced pulses of electrical energy to said transducer whereby an energy wave is radiated toward an object to be detected, and a receiver having a tuned input circuit and a variable gain amplifier tube effectively connected to said transducer for receiving echo pulses reflected from said object, the combination of a biased diode effectively connected in parallel with said tuned circuit for effectively short-circuiting said input circuit when the voltage therein exceeds the value of the bias applied to said rectifier, a resistance in circuit with said rectifier for developing bias voltage pulses concurrently with the application of said pulses to said transducer and said tuned circuit, means for storing said bias voltage pulses for a predeterminable period less than the period between successive pulses, and means for applying said bias voltage pulses to said variable gain amplifier tube to limit the gain thereof in proportion to the amplitude of said bias voltage.

AMEDEO D. ZAPPACOSTA.

REFERENCES CITED

The following references are of record in the file of this patent:

UNITED STATES PATENTS

| Number | Name | Date |
|---|---|---|
| 2,034,497 | Travis | Mar. 17, 1936 |
| 2,158,198 | Prescott | May 16, 1939 |
| 2,201,943 | Dallin | May 21, 1940 |
| 2,329,570 | Wellenstein et al. | Sept. 14, 1943 |